(12) United States Patent
Mo et al.

(10) Patent No.: US 11,057,138 B2
(45) Date of Patent: Jul. 6, 2021

(54) INTERFERENCE CANCELLATION METHOD AND BASE STATION

(71) Applicant: HUAWEI TECHNOLOGIES CO., LTD., Guangdong (CN)

(72) Inventors: Taofu Mo, Chengdu (CN); Bo Han, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/453,830

(22) Filed: Jun. 26, 2019

(65) Prior Publication Data
US 2019/0319731 A1 Oct. 17, 2019

Related U.S. Application Data

(63) Continuation of application No. PCT/CN2017/118185, filed on Dec. 25, 2017.

(30) Foreign Application Priority Data

Dec. 29, 2016 (CN) .......................... 201611249134.2

(51) Int. Cl.
*H04J 11/00* (2006.01)
*H04B 7/0413* (2017.01)
*H04B 7/06* (2006.01)
*H04L 5/00* (2006.01)
*H04L 27/26* (2006.01)

(52) U.S. Cl.
CPC ........ *H04J 11/0056* (2013.01); *H04B 7/0413* (2013.01); *H04B 7/063* (2013.01); *H04L 5/0051* (2013.01); *H04L 27/2613* (2013.01)

(58) Field of Classification Search
None
See application file for complete search history.

(56) References Cited

U.S. PATENT DOCUMENTS

| 5,680,395 | A | * | 10/1997 | Weaver, Jr. ....... | H04W 36/0066 370/331 |
| 10,461,962 | B2 | * | 10/2019 | Fechtel ................. | H04L 25/022 |

(Continued)

FOREIGN PATENT DOCUMENTS

| CN | 101841903 A | 9/2010 |
| CN | 104735789 A | 6/2015 |

(Continued)

*Primary Examiner* — Andrew C Oh
(74) *Attorney, Agent, or Firm* — Womble Bond Dickinson (US) LLP

(57) ABSTRACT

Embodiments of this application disclose an interference cancellation method and a base station. The method in the embodiments of this application may include obtaining, by a first base station, system information of a neighboring cell. The method may also include determining, by the first base station, interference channel information of a second base station to the first base station based on the system information, where the second base station is a base station in a coverage area of the neighboring cell. Furthermore, the method may also include receiving, by the first base station based on the interference channel information, an uplink signal sent by user equipment in a coverage area of the first base station.

12 Claims, 5 Drawing Sheets

(56) References Cited

U.S. PATENT DOCUMENTS

| | | | |
|---|---|---|---|
| 2004/0052305 A1* | 3/2004 | Olson | H04B 1/7117 375/148 |
| 2005/0195889 A1* | 9/2005 | Grant | H04B 1/707 375/148 |
| 2007/0111663 A1* | 5/2007 | Beyer | H04W 24/00 455/63.1 |
| 2007/0280368 A1* | 12/2007 | Jonsson | H04B 1/71075 375/262 |
| 2008/0064432 A1 | 3/2008 | Park et al. | |
| 2009/0052566 A1* | 2/2009 | Maltsev | H04L 25/023 375/260 |
| 2009/0181708 A1* | 7/2009 | Kim | H04B 7/0417 455/501 |
| 2009/0264087 A1* | 10/2009 | Chae | H04B 7/0408 455/114.2 |
| 2010/0136940 A1* | 6/2010 | Hui | H04L 25/0204 455/307 |
| 2010/0167679 A1* | 7/2010 | Lopez | H04L 25/0216 455/296 |
| 2011/0182375 A1* | 7/2011 | Kim | H04W 72/0426 375/260 |
| 2012/0040701 A1 | 2/2012 | Tong et al. | |
| 2012/0250808 A1* | 10/2012 | Lomnitz | H04L 25/022 375/346 |
| 2012/0327795 A1* | 12/2012 | Mallik | H04B 17/345 370/252 |
| 2013/0102256 A1* | 4/2013 | Cendrillon | H04B 7/0854 455/63.4 |
| 2013/0114517 A1* | 5/2013 | Blankenship | H04L 5/0053 370/329 |
| 2013/0195051 A1* | 8/2013 | Koivisto | H04W 72/082 370/329 |
| 2013/0250885 A1* | 9/2013 | Davydov | H04B 7/0652 370/329 |
| 2013/0279428 A1 | 10/2013 | Liu et al. | |
| 2013/0337800 A1* | 12/2013 | Gormley | H04W 72/082 455/423 |
| 2013/0344909 A1* | 12/2013 | Davydov | H04L 5/0023 455/501 |
| 2014/0010197 A1 | 1/2014 | Wang et al. | |
| 2014/0056272 A1* | 2/2014 | Gao | H04L 1/0035 370/329 |
| 2014/0233457 A1* | 8/2014 | Koutsimanis | H04L 5/0073 370/328 |
| 2014/0307664 A1* | 10/2014 | Chen | H04B 7/0456 370/329 |
| 2014/0321296 A1* | 10/2014 | Balraj | H04L 5/0032 370/252 |
| 2014/0357255 A1* | 12/2014 | Jonsson | H04B 17/318 455/422.1 |
| 2014/0370907 A1 | 12/2014 | Song et al. | |
| 2015/0003260 A1* | 1/2015 | Balraj | H04B 17/26 370/252 |
| 2015/0038183 A1 | 2/2015 | Callard et al. | |
| 2015/0092583 A1* | 4/2015 | Balraj | H04B 7/0639 370/252 |
| 2015/0098440 A1* | 4/2015 | Yang | H04L 5/0051 370/330 |
| 2015/0109944 A1* | 4/2015 | Koike | H04L 25/0202 370/252 |
| 2015/0146587 A1* | 5/2015 | Nagata | H04L 5/0085 370/280 |
| 2015/0215063 A1* | 7/2015 | Kuchi | H04J 11/005 370/329 |
| 2015/0288505 A1* | 10/2015 | Park | H04L 5/0091 370/336 |
| 2015/0326324 A1* | 11/2015 | Lee | H04B 15/00 370/328 |
| 2015/0334726 A1* | 11/2015 | Gao | H04B 7/0617 370/330 |
| 2015/0334743 A1* | 11/2015 | Chevallier | H04W 72/0453 370/329 |
| 2016/0029396 A1* | 1/2016 | Feng | H04W 72/0446 370/329 |
| 2016/0080063 A1* | 3/2016 | Sahara | H04B 7/02 370/329 |
| 2016/0119936 A1* | 4/2016 | Kim | H04J 11/0053 370/329 |
| 2016/0277082 A1* | 9/2016 | Janse van Rensburg | H04B 7/022 |
| 2017/0048872 A1* | 2/2017 | Chiu | H04W 16/02 |
| 2017/0126437 A1* | 5/2017 | Truong | H04L 25/0202 |
| 2017/0223686 A1* | 8/2017 | You | H04L 5/0048 |
| 2017/0346518 A1* | 11/2017 | Lim | H04B 1/12 |
| 2017/0366326 A1* | 12/2017 | Takano | H04L 5/0073 |
| 2018/0077704 A1* | 3/2018 | Adachi | H04W 36/0058 |
| 2019/0013983 A1* | 1/2019 | Gao | H04L 27/2655 |
| 2019/0028243 A1* | 1/2019 | Kim | H04L 27/2613 |

FOREIGN PATENT DOCUMENTS

| | | |
|---|---|---|
| CN | 105007248 A | 10/2015 |
| CN | 105792277 A | 7/2016 |
| CN | 107070581 A | 8/2017 |
| EP | 3185629 B1 | 8/2019 |
| JP | 2010200001 A | 9/2010 |
| JP | 2014036241 A | 2/2014 |
| JP | 2015204632 A | 11/2015 |
| KR | 20080022652 A | 3/2008 |
| RU | 2504904 C2 | 1/2014 |
| WO | 20141000213 A1 | 1/2014 |
| WO | 2016026107 A1 | 2/2016 |

* cited by examiner

INTERFERENCE CANCELLATION METHOD AND BASE STATION

CROSS-REFERENCE TO RELATED APPLICATIONS

This application is a continuation of International Application No. PCT/CN2017/118185, filed on Dec. 25, 2017, which claims priority to Chinese Patent Application No. 201611249134.2, filed on Dec. 29, 2016. The disclosures of the aforementioned applications are hereby incorporated by reference in their entireties.

TECHNICAL FIELD

This application relates to the communications field, and in particular, to an interference cancellation method and a base station.

BACKGROUND

In current wireless communications, a data signal is usually transferred in a time division duplex (TDD) or frequency division duplex (FDD) mode. These two modes are also two transmission standards that are mainly used nowadays. In the FDD mode, reception and transmission are performed on two separate symmetric frequency channels, and an uplink and a downlink are distinguished. A protection frequency band is used to separate a receive channel and a transmit channel. Resources in one direction of FDD are contiguous in time. In the TDD mode, different slots of a same frequency carrier are used to carry a receive channel and a transmit channel. Resources in one direction of TDD are non-contiguous in time. Time resources are allocated in two directions. In some time periods, a base station sends a signal to a mobile station, and in other time periods, the mobile station sends a signal to the base station. The base station and the mobile station need to cooperate with each other to work successfully. According to the idea of frequency division duplex or time division duplex, if time division duplex is used for transmission, time efficiency of radio communication is reduced; and if frequency division duplex is used for transmission, more radio spectrum resources are consumed. A full-duplex communications technology is a communications technology different from TDD and FDD. The full-duplex communications technology enables both parties of communication to transmit information at a same time and a same frequency. This saves half frequency or time resources, so that transmission efficiency increases to a new height and a capacity of a radio network system grows exponentially.

In prior systems, in networking scenarios of a plurality of evolved NodeBs (eNB) using the full-duplex communications technology, interference between the eNBs is relatively large. The eNB simultaneously performs uplink and downlink transmission. In this case, the interference between the eNBs is remarkably strong. As shown in FIG. 1, a downlink signal sent by an eNB1 to UE2 may interfere with uplink reception of an eNB2 from UE3, and vice versa. Therefore, interference between cells in a co-time co-frequency full-duplex communications system is relatively large.

SUMMARY

This application provides an interference cancellation method and a base station, to effectively reduce interference between cells in a co-time co-frequency full-duplex communications system.

In view of this, a first aspect of embodiments of this application provides an interference cancellation method. In the interference cancellation method, a first base station may obtain system information of a neighboring cell; the first base station may determine interference channel information of a second base station to the first base station based on the obtained system information of the neighboring cell, where the second base station is in a coverage area of the neighboring cell; and when receiving an uplink signal sent by user equipment in a coverage area of the first base station, the first base station may receive, based on the determined interference channel information, the uplink signal sent by the user equipment. It should be noted that the second base station is generally a base station in a neighboring cell of a cell in which the first base station is located, that is, in a coverage area of a cell neighboring to the cell in which the first base station is located.

To be specific, in the technical solutions provided in this embodiment of this application, the first base station estimates an interference channel of the second base station in the neighboring cell to the first base station and obtains interference channel information. Therefore, when the first base station receives an uplink signal sent by user equipment, interference impact from base stations in other cells can be comprehensively considered. This can effectively reduce interference between cells in a co-time co-frequency full-duplex communications system.

In a possible embodiment, the first base station may obtain the system information of the neighboring cell in a plurality of manners. One of the manners is specifically obtaining the system information of the neighboring cell of the first base station by using a data packet capturing tool. For example, in this embodiment of this application, physical cell identifier (PCI) information of the neighboring cell can be obtained by using a sniffer that acts as a data packet capturing tool, and then the system information of the neighboring cell of the first base station is obtained based on the obtained PCI information of the neighboring cell of the first base station.

Therefore, in this embodiment of this application, a method of the first base station for obtaining the system information of the neighboring cell is provided, increasing practicability of the solution.

In a possible embodiment, that the first base station determines interference channel information of a second base station to the first base station is determining a multiple-input multiple-output system (MIMO) MIMO interference channel matrix of the second base station to the first base station based on the obtained system information.

In a possible embodiment, the determining, by the first base station, a MIMO interference channel matrix of the second base station to the first base station based on the system information may be specifically determining the MIMO interference channel matrix of the second base station to the first base station by using a synchronization sequence and a cell-specific reference signal (CRS) pilot sequence of the neighboring cell.

In this embodiment of this application, the first base station may determine the MIMO interference channel matrix of the second base station to the first base station by using the synchronization sequence and the cell-specific reference signal CRS pilot sequence of the neighboring cell. This increases practicability of the solution.

In a possible embodiment, that the first base station receives, based on the interference channel information, an uplink signal sent by user equipment in a coverage area of the first base station is specifically that the first base station determines a corresponding interference autocorrelation matrix based on the obtained MIMO interference channel matrix and uses the interference autocorrelation matrix to receive, by using an interference rejection combining (IRC) receiver, the uplink signal sent by the user equipment.

In a possible embodiment, in the interference cancellation method, after the first base station obtains the MIMO interference channel matrix of the second base station to the first base station, the first base station may feed the MIMO interference channel matrix by which the second base station causes interference to the first base station, back to the second base station. In other words, the first base station may further send the interference channel information to the second base station, so that the second base station can send a downlink signal based on the downlink interference channel information, fed back by the base station, by which the second base station causes interference to the first base station, when sending the downlink signal to user equipment in a coverage area of the second base station.

A second aspect of the embodiments of this application provides an interference cancellation method. In the interference cancellation method, a second base station receives interference channel information of the second base station to a first base station that is fed back by the first base station, where the interference channel information is determined by the first base station based on system information of a cell in which the second base station is located. After the second base station receives the interference channel information of the second base station to the first base station that is sent by the first base station, when the second base station is sending a downlink signal to user equipment in a coverage area of the second base station, the second base station may send the downlink signal to the user equipment in the coverage area of the second base station based on the received interference channel information.

In a possible embodiment, that the second base station sends the downlink signal to the user equipment in the coverage area of the second base station based on the interference channel information is sending, based on the received interference channel information, the downlink signal to the user equipment in the coverage area of the second base station in a null forming manner, where a null forming direction of a transmit beam of the second base station is aligned with the first base station when the second base station is sending the downlink signal to the user equipment.

In a possible embodiment, the sending, by the second base station based on the interference channel information, the downlink signal to the user equipment in the coverage area of the second base station in a null forming manner is specifically that the second base station performs singular value decomposition on the MIMO interference channel matrix to obtain the following factorization:

$$H^C_{eNB1} = U_H \Lambda_H V_H.$$

In the factorization, $H^C_{eNB1}$ is the MIMO interference channel matrix of the second base station to the first base station, $U_H$ and $V_H$ are singular vectors corresponding to $H^C_{eNB1}$, $H^C_{eNB1}$ is an m*n matrix, $U_H$ is a corresponding m*m matrix, $V_H$ is a corresponding n*n matrix, and $\Lambda_H$ is a diagonal matrix with which $U_H$ and $V_H$ make the foregoing factorization hold true.

After the second base station performs singular value decomposition on the MIMO interference channel matrix and obtains the foregoing corresponding factorization, the second base station determines a quantity y of non-zero singular values of the diagonal matrix $\Lambda_H$, and uses a vector behind a column y+1 of $V_H$ as a transmit null forming weight for transmission of the downlink signal by the second base station. The second base station may send the downlink signal to the user equipment in the coverage area of the second base station based on the determined transmit null forming weight when sending the downlink signal to the user equipment in the coverage area of the second base station.

A third aspect of the embodiments of this application provides a base station. The base station has functions of implementing actions of the first base station in the foregoing method. The functions may be implemented by hardware, or may be implemented by hardware executing corresponding software. The hardware or the software includes one or more modules corresponding to the foregoing functions.

In a possible embodiment, a structure of the base station includes a receiver, a processor, and a transmitter. The receiver is configured to support communication between the base station and user equipment by receiving from the user equipment, the information or instruction used in the method in the first aspect. The processor is configured to support the base station in performing corresponding functions of the first base station in the method. The transmitter is configured to support communication between the base station and user equipment by sending to the user equipment, the information or instruction used in the method in the first aspect. The base station may further include a memory. The memory is configured to be coupled to the processor, and stores a program instruction and data that are necessary for the base station.

In a possible embodiment, the base station includes an obtaining module, a processing module, and a receiving module. The obtaining module is configured to obtain system information of a neighboring cell; the processing module is configured to determine interference channel information of a second base station to the first base station based on the system information obtained by the obtaining module, where the second base station is a base station in a coverage area of the neighboring cell; and the receiving module is configured to receive, based on the information that is about the interference channel and is determined by the processing module, an uplink signal sent by user equipment in a coverage area of the first base station.

A fourth aspect of the embodiments of this application provides a base station. The base station has functions of implementing actions of the second base station in the foregoing method. The functions may be implemented by hardware, or may be implemented by hardware executing corresponding software. The hardware or the software includes one or more modules corresponding to the foregoing functions.

In a possible embodiment, a structure of the base station includes a receiver, a processor, and a transmitter. The receiver is configured to support communication between the base station and user equipment by receiving from the user equipment, the information or instruction used in the method in the second aspect. The processor is configured to support the base station in performing corresponding functions of the second base station in the method. The transmitter is configured to support communication between the base station and user equipment by sending to the user equipment, the information or instruction used in the method in the second aspect. The base station may further include a memory. The memory is configured to be coupled to the processor, and stores a program instruction and data that are necessary for the base station.

In a possible embodiment, the base station includes a receiving module and a sending module. In the base station, the receiving module is configured to receive interference channel information of the second base station to a first base station that is sent by the first base station, where the interference channel information is determined by the first base station based on system information of a cell in which the second base station is located; and the sending module is configured to send a downlink signal to user equipment in a coverage area of the second base station based on the information that is about the interference channel and is received by the receiving module.

A fifth aspect of this application provides a computer storage medium. The computer storage medium stores program code, and the program code is used to instruct to execute the method in the first aspect or the second aspect.

It can be learned from the foregoing technical solutions that in the interference cancellation method, the first base station obtains the system information of the neighboring cell; determines the interference channel information of the second base station to the first base station based on the system information, where the second base station is a base station in the coverage area of the neighboring cell; and receives, based on the interference channel information, the uplink signal sent by the user equipment in the coverage area of the first base station. To be specific, in the technical solutions provided in this embodiment of this application, the first base station estimates an interference channel of the second base station in the neighboring cell to the first base station and obtains interference channel information. Therefore, when the first base station receives an uplink signal sent by user equipment, interference impact from base stations in other cells can be comprehensively considered. This can effectively reduce interference between cells in a co-time co-frequency full-duplex communications system.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and persons skilled in the art may derive other drawings from these accompanying drawings.

DESCRIPTION OF EMBODIMENTS

This application provides an interference cancellation method and a base station, to effectively reduce interference between cells in a co-time co-frequency full-duplex communications system.

To make persons skilled in the art understand the solutions in this application better, the following describes the technical solutions in the embodiments of this application with reference to the accompanying drawings in the embodiments of this application. Apparently, the described embodiments are merely some but not all of the embodiments of this application. All other embodiments obtained by persons of ordinary skill in the art based on the embodiments of this application shall fall within the protection scope of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in appropriate circumstances so that the embodiments described herein can be implemented in orders other than the order illustrated or described herein. Moreover, the term "include" and any of their variants mean to cover the non-exclusive inclusion. For example, a process, method, system, product, or device that includes a list of steps or units is not necessarily limited to those steps or units expressly listed, but may include other units not expressly listed or inherent to such a process, method, system, product, or device.

Figure 1:
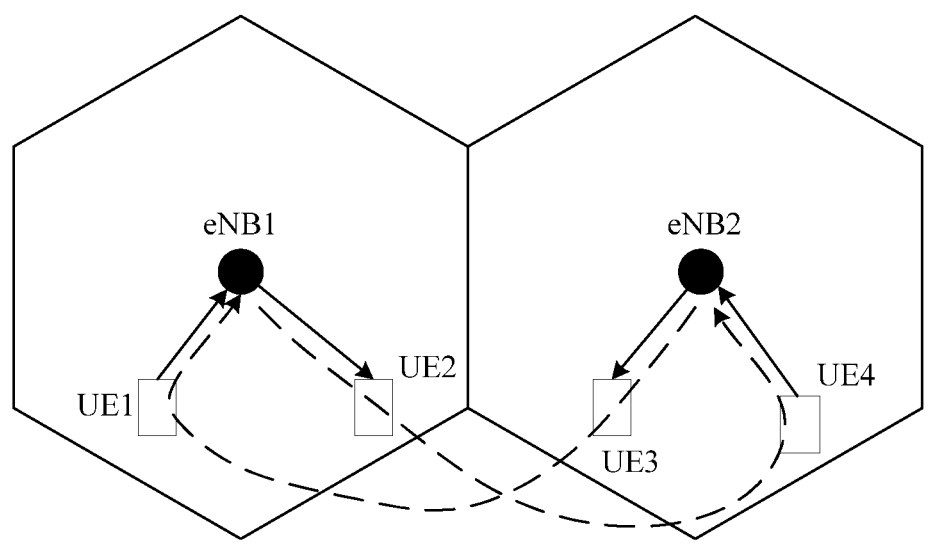
FIG. 1 is a schematic diagram of a network system architecture.
Figure 2:
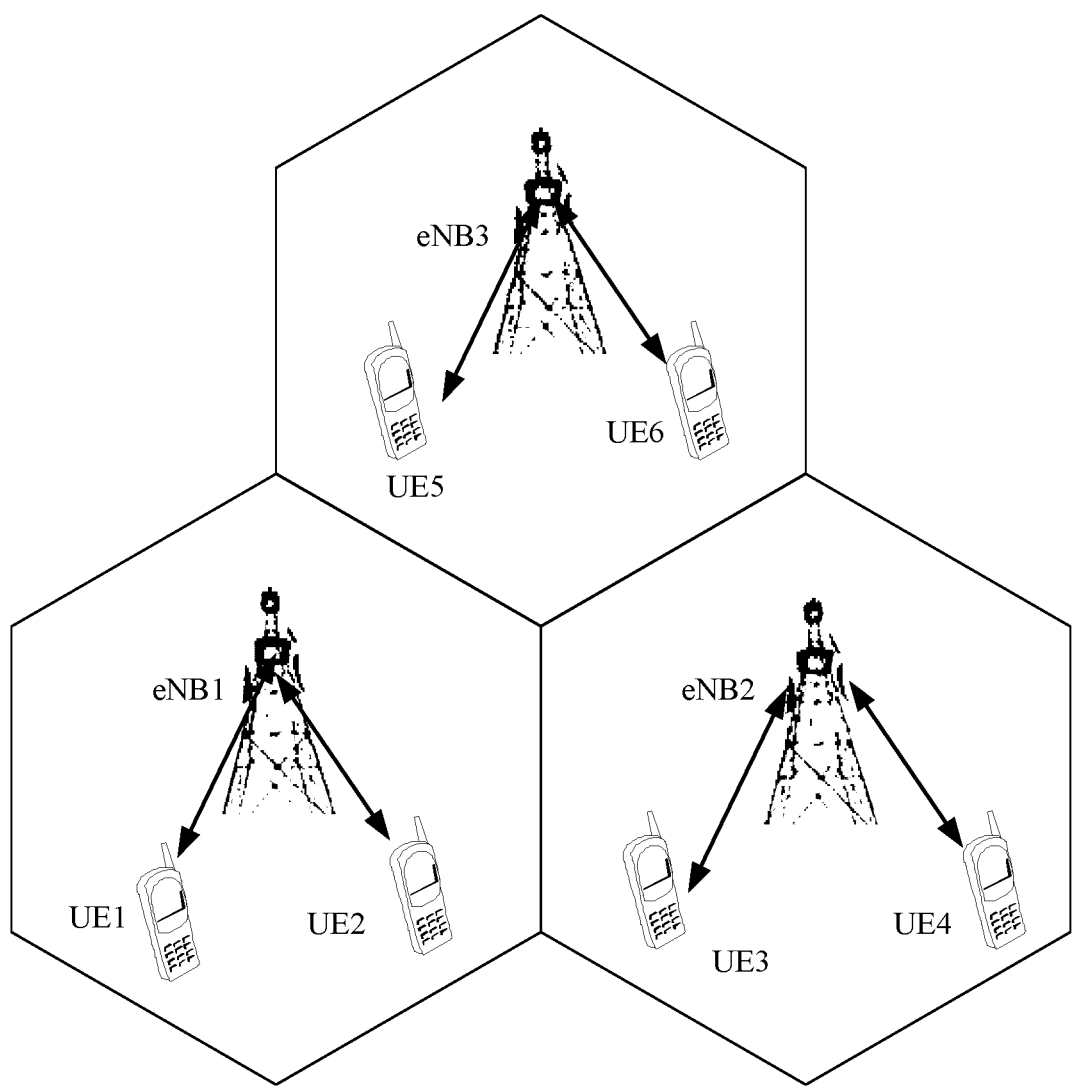
FIG. 2 is a schematic diagram of a system architecture of an interference cancellation method according to an embodiment of this application.

FIG. 2 is a schematic diagram of a network architecture of an interference cancellation method according to an embodiment of this application. A plurality of base stations (an eNB1, an eNB2, and an eNB3) and a plurality of user equipments (UE1 to UE6) are included. The network architecture shown in FIG. 2 divides a network service area into cells of regular hexagons. A base station is deployed in each cell, and the base station provides network coverage for user equipments in the cells.

As shown in FIG. 2, the regular hexagon under each base station represents a network coverage area of the current base station, and a cellular network structure is formed. User equipment 1 (UE1) and user equipment 2 (UE2) are in a network coverage area of the eNB1. The eNB2 and eNB3 are base stations in a neighboring cell of the cell in which the eNB1 is currently located. In the embodiments of this application, a first base station obtains system information of a neighboring cell, where the first base station is any base station in the network architecture shown in FIG. 2. The first base station determines interference channel information between a second base station and the first base station based on the system information, where the second base station is a base station in a coverage area of the neighboring cell. The first base station sends a downlink signal to user equipment in a coverage area of the first base station based on the interference channel information. For example, when the eNB1 needs to send a downlink signal to the UE1, the eNB1 first obtains system information of a neighboring cell of the eNB1, then determines interference channel information between the eNB1 and the eNB2 and interference channel information between the eNB1 and the eNB3 based on the obtained system information, and finally sends the downlink signal to the UE1 based on the obtained interference channel information.

Figure 3:
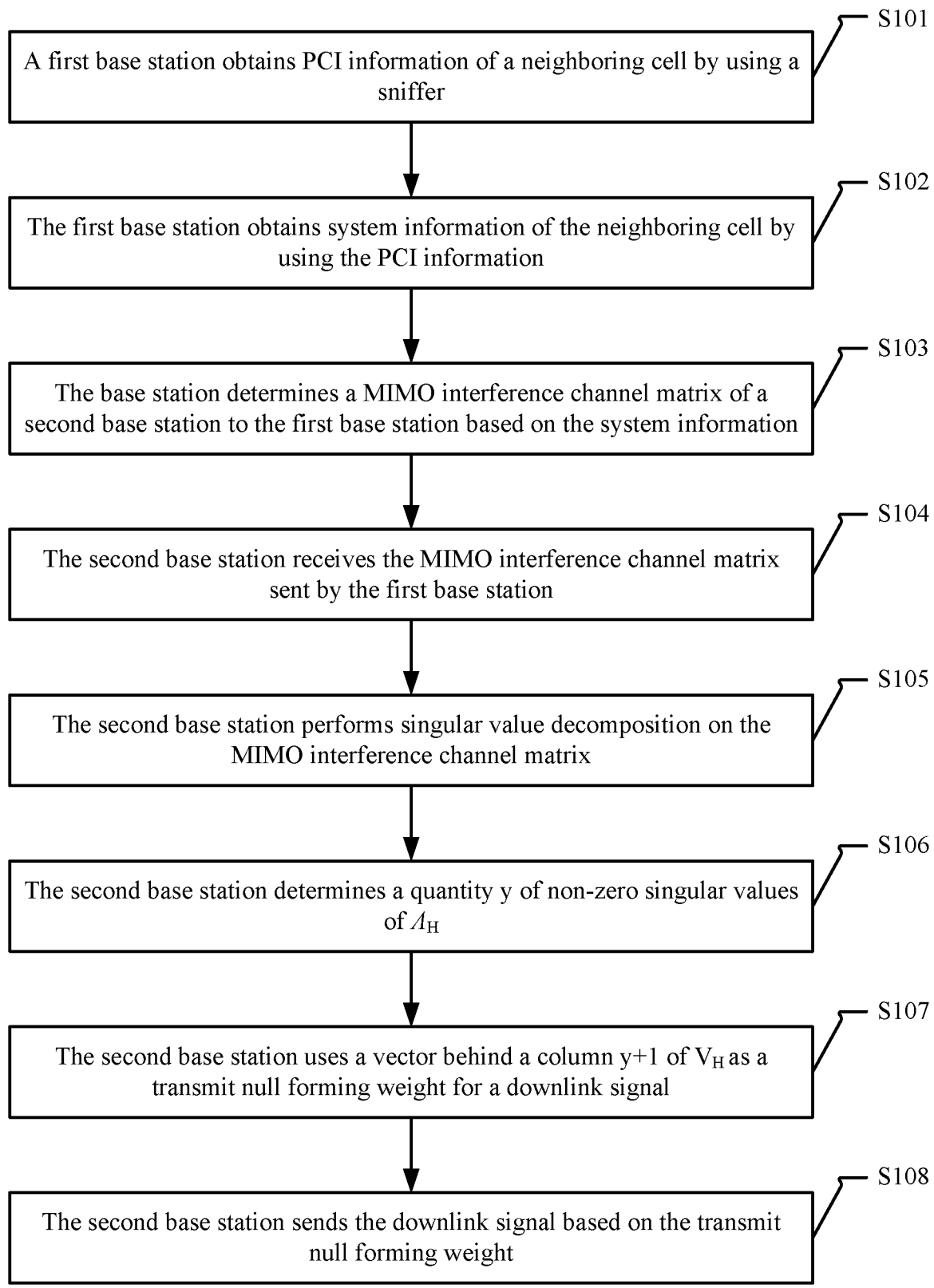
FIG. 3 is a schematic flowchart of an embodiment of an interference cancellation method in the embodiments of this application.

For ease of understanding, the following describes in detail the embodiments of this application by using a specific embodiment. FIG. 3 is a schematic flowchart of an embodiment of the embodiments of this application, including the following steps.

S101: A first base station obtains PCI information of a neighboring cell by using a sniffer.

The PCI information of the neighboring cell is a physical cell identifier of the neighboring cell, and is used to distinguish radio signals in different cells, so as to ensure that there is no duplicate physical cell identifier in coverage areas of the related cells. Each cell has only one physical cell identifier. In LTE, it is specified that cell ID grouping is used in an LTE cell search process. A cell group ID is first determined by using a secondary synchronization channel (SSCH), and then a specific cell ID is determined by using a primary synchronization channel (PSCH).

The sniffer, also known as a data packet capturing tool, is a network analysis means based on a passive snooping principle. This technical means may be used to monitor a status of and data flows in a network, as well as information transmitted over the network.

In this embodiment of this application, the first base station obtains the PCI information of the neighboring cell by using the sniffer, and the neighboring cell is a cell neighboring to the cell in which the first base station is located.

S102: The first base station obtains system information of the neighboring cell by using the PCI information.

After obtaining the PCI information of the neighboring cell, the first base station may obtain the system information of the neighboring cell by using the obtained PCI information. Optionally, in this embodiment of this application, the first base station may obtain a synchronization sequence and a CRS pilot sequence of the neighboring cell by using the PCI information.

S103: The first base station determines a MIMO interference channel matrix of a second base station to the first base station based on the system information.

After obtaining the system information of the neighboring cell, the first base station may determine interference channel information of the second base station to the first base station based on the system information.

A multi-antenna technology is usually used in current base stations. Therefore, in this embodiment of this application, the MIMO interference channel matrix of the second base station to the first base station may be determined based on the system information. The second base station is a base station in a neighboring cell of the cell in which the first base station is located.

Figure 4:
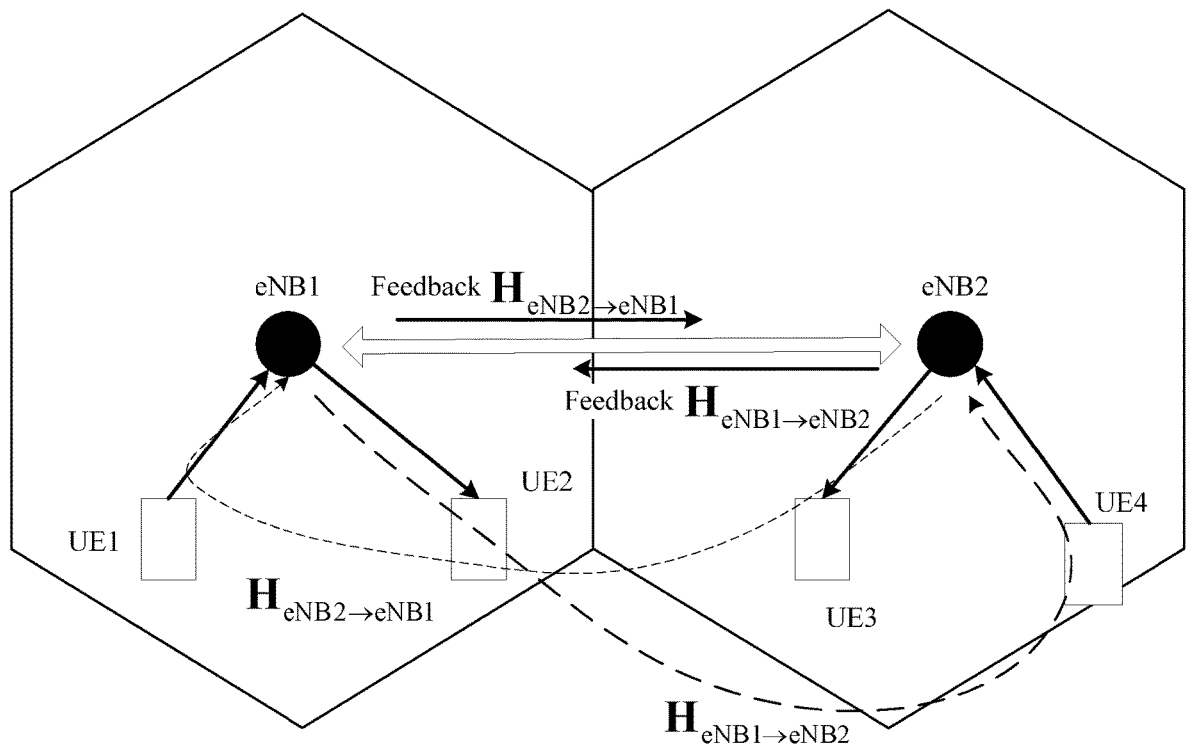
FIG. 4 is a schematic diagram of an application scenario of an interference cancellation method according to an embodiment of this application.

In FIG. 4, that an eNB1 acts as the first base station in this embodiment of this application is used as an example. When a cell in which the eNB1 is located is enabled, PCI information of a neighboring cell in which an eNB2 is located is obtained by using a sniffer. System information of the neighboring cell is obtained based on the PCI information, including a synchronization sequence and a CRS pilot sequence of the neighboring cell. After these reference signals are obtained, estimation is performed at a corresponding location of a radio signal frame to measure an interference signal power and an interference channel of the neighboring cell. To be specific, the eNB1 may estimate an interference channel $H_{eNB2 \to eNB1}$ of the eNB2 to the eNB1 based on the obtained system information. When the base stations are multi-antenna base stations, the MIMO interference channel of the eNB2 to the eNB1 is estimated.

In addition, it should be noted that, because locations of base stations are normally fixed, change of interference between base stations in cells neighboring to each other is not significant. Therefore, the MIMO interference channel may be estimated within a preset period, for example, 500 ms or a longer or shorter period. A specific period range is not limited herein.

Similarly, after the first base station has estimated the MIMO interference channel information of the second base station in the neighboring cell to the first base station, the first base station feeds the MIMO interference channel information back to the corresponding second base station in the neighboring cell by using X2 or other approaches. For example, as shown in FIG. 4, the eNB1 feeds the MIMO interference channel of the eNB2 to the eNB1 back to the eNB2. Finally, each eNB may obtain a list of MIMO interference channels of neighboring cells.

$$H_{eNB1 \to eNBj}, j=1, \ldots, K, \text{ where}$$

K is a quantity of neighboring cells that may receive interference from the eNB1. Likewise, each eNB also establishes a list of MIMO interference channels of neighboring eNBs to the eNB;

$$H_{eNBi \to eBN1}, i=1, \ldots, K, \text{ where } K \text{ represents a quantity}$$
of neighboring cells that may cause interference to the eNB1.

It should be noted that the example in FIG. 4 is only an example for description herein, and does not constitute a limitation on this embodiment of this application.

In this embodiment of this application, after the eNB1 obtains $H_{eNB1 \to eNBj}$, $j=1, \ldots, K$, the eNB1 combines the MIMO interference channels of the eNB1 to other cells, into one MIMO interference channel matrix:

$$H^C_{eNB1} = [H_{eNB1 \to eNB2}^T, H_{eNB1 \to eNB3}^T, \ldots, H_{eNB1 \to eNBK}^T].$$

S104: The second base station receives the MIMO interference channel matrix sent by the first base station.

Similarly, after the first base station has estimated the MIMO interference channel information of the second base station in the neighboring cell to the first base station, the first base station feeds the MIMO interference channel information back to the corresponding second base station in the neighboring cell by using X2 or other approaches. The second base station may receive the MIMO interference channel matrix fed back by the first base station.

S105: The second base station performs singular value decomposition on the MIMO interference channel matrix.

After obtaining the MIMO interference channel matrix, the first base station performs singular value decomposition on the MIMO interference channel matrix to obtain the following factorization:

$$H_{eNB1}^C = U_H \Lambda_H V_H.$$

$H^C_{eNB1}$ is the MIMO interference channel matrix of the second base station to the first base station, $U_H$ and $V_H$ are singular vectors corresponding to $H^C_{eNB1}$, $H^C_{eNB1}$ is an m*n matrix, $U_H$ is an m*m matrix corresponding to $H^C_{eNB1}$, and $V_H$ is an n*n matrix corresponding to $H^C_{eNB1}$. $\Lambda_H$ is a corresponding diagonal matrix that makes $H^C_{eNB1} = U_H \Lambda_H V_H$ hold true. A specific singular value decomposition process on the matrix is not described herein.

S106: The second base station determines a quantity y of non-zero singular values of $\Lambda_H$.

S107: The second base station uses a vector behind a column y+1 of $V_H$ as a transmit null forming weight for a downlink signal.

In this embodiment of this application, the first base station uses vectors behind a column M+1 of $V_H$ as downlink transmit null forming weights $w_1$ for downlink signals, where $H_{eNB1}{}^C w_1=0$ holds true.

S108: The second base station sends the downlink signal based on the transmit null forming weight.

After the transmit weight $w_1$ is obtained, when the second base station needs to send a downlink signal to user equipment in the coverage area of the first base station, a null forming manner is used. The second base station sends the downlink signal to the user equipment in the coverage area of the first base station based on the calculated transmit null forming weight $w_1$.

FIG. 4 is still used as an example. It should be understood that, the vectors behind the column y+1 of $V_H$ are vectors in null space, and therefore these vectors are orthogonal to $H_{eNB1}{}^C$. When the eNB1 performs weighting by using these vectors, the eNB2 cannot receive signals weighted by using these vectors. For example, a downlink transmit signal is x, and a vector $w_1$ behind the column y+1 is selected to transmit the signal to the UE2. Therefore, a weighted transmit vector is $w_1 x$ and a signal received by the UE2 is $H_{eNB1 \to UE2} w_1 x$. $H_{eNB1 \to UE2}$ represents a channel from the eNB1 to the UE2. In addition, a signal from the eNB1 to the eNB2 is $H_{eNB1 \to eNB2} w_1 x$. Because $H_{eNB1 \to eNB2} w_1=0$, the eNB2 receives no interference from the eNB1.

It should be noted that, in this embodiment of this application, when the first base station is receiving an uplink signal sent by user equipment, the first base station determines a corresponding interference autocorrelation matrix based on the interference channel information; and uses the interference autocorrelation matrix to receive the uplink signal by using an interference rejection combining (IRC) receiver.

Therefore, in this embodiment of this application, a base station not only uses transmit weighing to reduce interference between base stations, but also considers interference from other cells in a reception process of the base station. To reduce interference, every base station uses an IRC receiver and obtains the interference autocorrelation matrix by using the IRC receiver. An interference power and an interference channel $H_{eNBi \to eNB1}$, i=1, ..., K that interfere with the eNB are both measured. Therefore, an interference autocorrelation matrix between eNBs can be obtained based on the information. The interference between the eNBs is further suppressed by using the IRC receiver, to reduce the interference between the eNBs.

It can be learned from the foregoing technical solutions that in the interference cancellation method, the first base station obtains the system information of the neighboring cell; determines the interference channel information of the second base station to the first base station based on the system information, where the second base station is a base station in the coverage area of the neighboring cell; and receives, based on the interference channel information, the uplink signal sent by the user equipment in the coverage area of the first base station. To be specific, in the technical solutions provided in this embodiment of this application, the first base station estimates an interference channel of the second base station in the neighboring cell to the first base station and obtains interference channel information. Therefore, when the first base station receives an uplink signal sent by user equipment, interference impact from base stations in other cells can be comprehensively considered. This can effectively reduce interference between cells in a co-time co-frequency full-duplex communications system.

Figure 5:
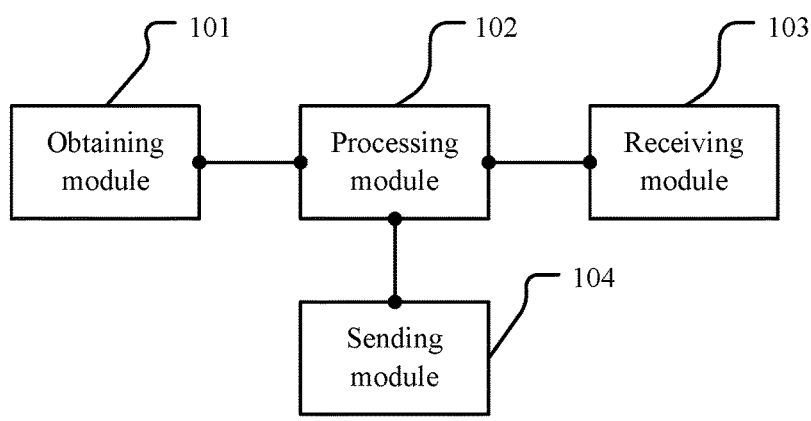
FIG. 5 is a schematic structural diagram of an embodiment of a base station in the embodiments of this application.

The foregoing describes the interference cancellation method in the embodiments of this application. Based on the method, the embodiments of this application further provide a base station. The following describes the base station in the embodiments of this application. FIG. 5 is a schematic diagram of an embodiment of the base station in the embodiments of this application. The base station acts as a first base station and includes an obtaining module 101, a processing module 102, a receiving module 103, and a sending module 104.

The obtaining module 101 is configured to obtain system information of a neighboring cell.

The processing module 102 is configured to determine interference channel information of a second base station to the first base station based on the system information obtained by the obtaining module 101, where the second base station is a base station in a coverage area of the neighboring cell.

The receiving module 103 is configured to receive, based on the information that is about the interference channel and is determined by the processing module, an uplink signal sent by user equipment in a coverage area of the first base station.

In a possible embodiment, the obtaining module 101 is specifically configured to:

obtain PCI information of the neighboring cell by using a sniffer; and obtain the system information of the neighboring cell by using the PCI information.

In a possible embodiment, the processing module 102 is specifically configured to:

determine a MIMO interference channel matrix of the second base station to the first base station based on the system information obtained by the obtaining module 101.

In a possible embodiment, the processing module 102 is specifically configured to:

determine the MIMO interference channel matrix of the second base station to the first base station by using a synchronization sequence and a cell-specific reference signal CRS pilot sequence of the neighboring cell.

In a possible embodiment, the processing module 102 is further configured to:

determine a corresponding interference autocorrelation matrix based on the MIMO interference channel matrix; and the receiving module 103 is configured to:

use the interference autocorrelation matrix to receive, by using an interference rejection combining IRC receiver, the uplink signal sent by the user equipment in the coverage area of the first base station.

In a possible embodiment, the sending module 104 is configured to send the interference channel information to the second base station, so that the second base station sends a downlink signal based on the interference channel information when sending the downlink signal to user equipment in a coverage area of the second base station.

Figure 6:
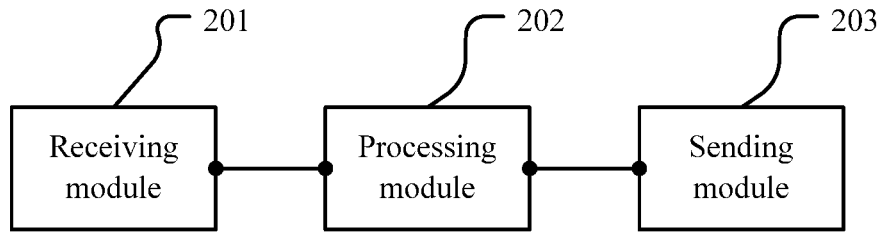
FIG. 6 is a schematic structural diagram of another embodiment of a base station in the embodiments of this application.

FIG. 6 is a schematic diagram of another embodiment of the base station in the embodiments of this application. The base station acts as a second base station and includes a receiving module 201, a sending module 202, and a processing module 203.

The receiving module 201 is configured to receive information that is about an interference channel to a first base station and is sent by the first base station, where the interference channel information is determined by the first base station based on system information, and the system information is system information of a cell in which the second base station is located.

The sending module 202 is configured to send a downlink signal to user equipment in a coverage area of the second base station based on the interference channel information.

In a possible embodiment, the sending module 202 is specifically configured to:

send, based on the interference channel information, the downlink signal to the user equipment in the coverage area of the second base station in a null forming manner, where a null forming direction of a transmit beam used by the second base station to send the downlink signal is aligned with the first base station.

In a possible embodiment, the interference channel information is a MIMO interference channel matrix of the second base station to the first base station.

The processing module 203 is configured to perform singular value decomposition on the MIMO interference channel matrix to obtain the following factorization:

$$H^C_{eNB1} = U_H \Lambda_H V_H, \text{ where}$$

$H^C_{eNB1}$ is the MIMO interference channel matrix of the second base station to the first base station, $U_H$ and $V_H$ are singular vectors corresponding to $H^C_{eNB1}$, $H^C_{eNB1}$ is an m*n matrix, $U_H$ is a corresponding m*m matrix, and $V_H$ is a corresponding n*n matrix;

determine a quantity y of non-zero singular values of $\Lambda_H$; and use a vector behind a column y+1 of $V_H$ as a transmit null forming weight for a downlink signal.

The sending module 202 is specifically configured to:

send the downlink signal to the user equipment in the coverage area of the second base station based on the transmit null forming weight.

It can be learned from the foregoing technical solutions that in this embodiment, the first base station obtains the system information of the neighboring cell; determines the interference channel information of the second base station to the first base station based on the system information, where the second base station is a base station in the coverage area of the neighboring cell; and receives, based on the interference channel information, the uplink signal sent by the user equipment in the coverage area of the first base station. To be specific, in the technical solutions provided in this embodiment of this application, the first base station estimates an interference channel of the second base station in the neighboring cell to the first base station and obtains interference channel information. Therefore, when the first base station receives an uplink signal sent by user equipment, interference impact from base stations in other cells can be comprehensively considered. This can effectively reduce interference between cells in a co-time co-frequency full-duplex communications system.

Figure 7:
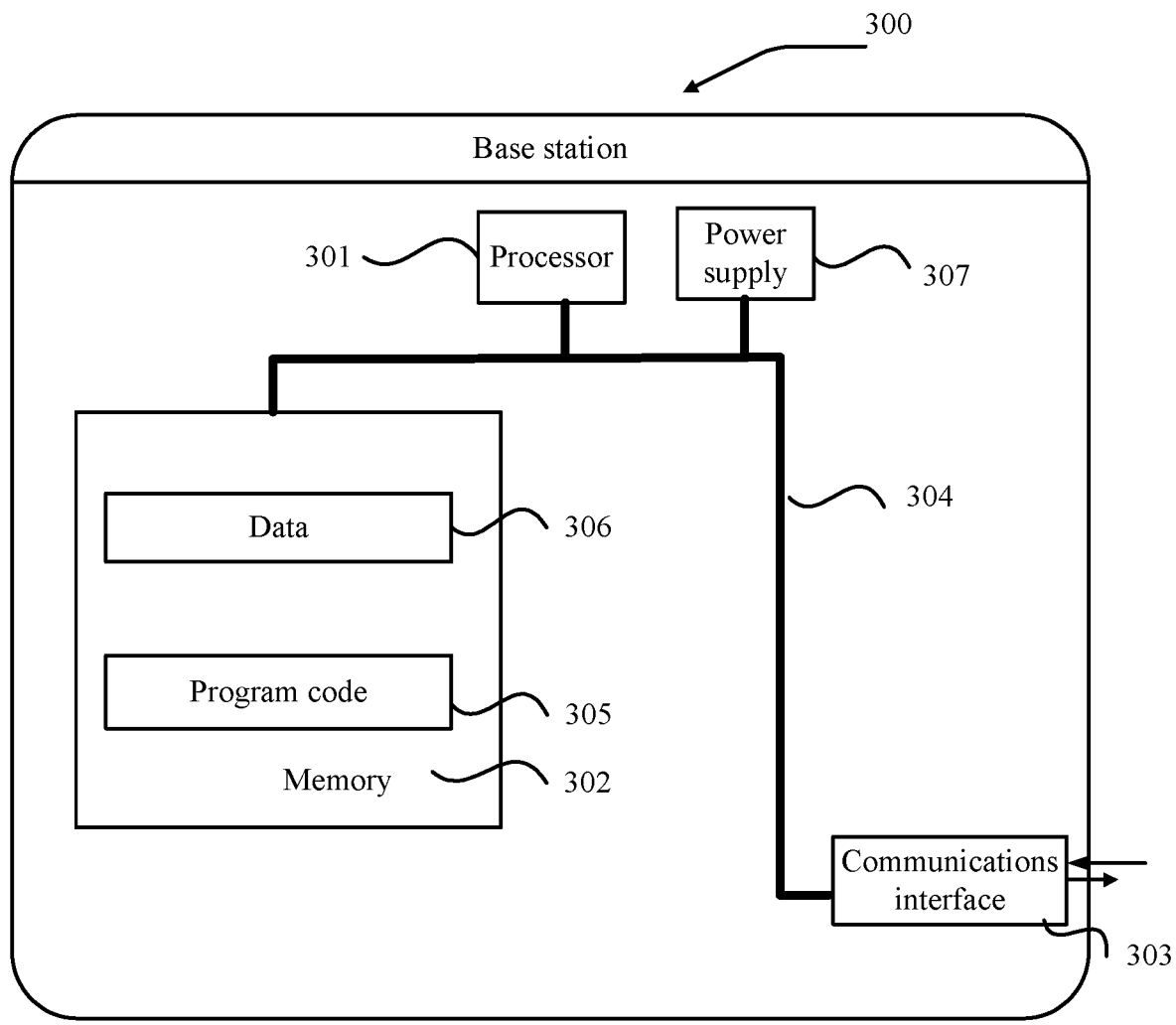
FIG. 7 is a schematic structural diagram of another embodiment of a base station in the embodiments of this application.

The foregoing describes the base station in the embodiments of this application from a perspective of modular functions, and the following describes the base station in the embodiments of this application from a perspective of hardware processing. As shown in FIG. 7, for ease of description, only a portion related to this embodiment of this application is shown. For specific technical details not disclosed, refer to the method corresponding to this embodiment of this application. FIG. 7 is a schematic structural diagram of an embodiment of a base station in the embodiments of this application. The base station 300 includes a processor 301, a memory 302, and a communications interface 303. The processor 301, the memory 302, and the communications interface 303 are connected to each other through a bus 304.

The processor 301 may be a central processing unit (CPU), a network processor (NP), or a combination of a CPU and an NP. The processor may further include a hardware chip, which may be specifically an application-specific integrated circuit (ASIC), a programmable logic device (PLD), or a combination thereof. In addition, the PLD may be a complex programmable logic device (CPLD), a field-programmable gate array (FPGA), a generic array logic (GAL), or any combination of thereof. No limitation is imposed thereon in this application.

The memory 302 may include a volatile memory, for example, a random access memory (RAM); or the memory may include a non-volatile memory, for example, a flash memory, a hard disk drive (HDD) or a solid-state drive (SSD); or the memory may include a combination of the foregoing types of memories.

The bus 304 may be a Peripheral Component Interconnect (PCI) bus, an Extended Industry Standard Architecture (EISA) bus, or the like. The bus may be further classified into an address bus, a data bus, a control bus, and the like. For ease of representation, only one thick line is used in FIG. 7 to represent the bus, but this does not mean that there is only one bus or only one type of bus.

The communications interface 303 is configured to send or receive an instruction or information used by the base station in the foregoing method embodiments, for example, interference channel information and system information of a neighboring cell.

The memory 302 may store program code 305, and may further store data 306 used by the first base station or the second base station in the foregoing method embodiments. For example, the data 306 may be interference channel information and system information of a neighboring cell. The processor 301 may invoke the program code 305 stored in the memory to implement the steps corresponding to the first base station or the second base station in the foregoing method embodiments, so that the base station can ultimately implement actions or functions of the first base station or the second base station in the foregoing method embodiments.

The base station 300 may further include a power supply 307.

It should be noted that the system structure of the base station shown in FIG. 7 does not constitute a limitation on the base station structure in this embodiment of this application. The system structure of the base station may include components more or fewer than those shown in the figure, or combine some components, or have different arrangements of components. Details are not described herein again.

The steps implemented by a base station in the embodiments of this application may be based on the schematic structural diagram of the base station shown in FIG. 7. For specific details, refer to the corresponding process of the base station in the foregoing method embodiments. Details are not described herein again.

In the several embodiments provided in this application, it should be understood that the disclosed system, module, and method may be implemented in other manners. For example, the described apparatus embodiments are merely examples. For example, the module division is merely division by logical function and may be other division in actual implementation. For example, a plurality of units or components may be combined or integrated into another system, or some features may be ignored or may not be performed. In addition, the displayed or discussed mutual couplings or direct couplings or communication connections may be indirect couplings or communication connections through some interfaces, apparatuses or units, and may be implemented in electronic, mechanical, or other forms.

The units described as separate parts may or may not be physically separate. Part displayed as units may or may not be physical units, and may be located in one position or distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a USB flash drive, a portable hard disk, a read-only memory (ROM), a random access memory (RAM), a magnetic disk, or an optical disc.

In conclusion, the foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. An interference cancellation method, comprising:
    obtaining, by a first base station, system information of a neighboring cell comprising:
        obtaining, by the first base station, physical cell identifier (PCI) information of the neighboring cell using a sniffer, and
        obtaining, by the first base station, the system information of the neighboring cell using the PCI information;
    determining, by the first base station, interference channel information of a second base station to the first base station based on the system information, wherein the second base station is a base station in a coverage area of the neighboring cell, and the determining comprises determining, by the first base station, a multiple-input multiple-output system (MIMO) interference channel matrix of the second base station to the first base station based on the system information; and
    receiving, by the first base station based on the interference channel information, an uplink signal sent by user equipment in a coverage area of the first base station.

2. The method according to claim 1, wherein the determining, by the first base station, the MIMO interference channel matrix of the second base station to the first base station based on the system information comprises:
    determining, by the first base station, the MIMO interference channel matrix of the second base station to the first base station using a synchronization sequence and a cell-specific reference signal (CRS) pilot sequence of the neighboring cell.

3. The method according to claim 1, wherein the receiving, by the first base station based on the interference channel information, the uplink signal sent by user equipment in the coverage area of the first base station comprises:
    determining, by the first base station, a corresponding interference autocorrelation matrix based on the MIMO interference channel matrix; and
    using, by the first base station, the interference autocorrelation matrix to receive, using an interference rejection combining (IRC) receiver, the uplink signal sent by the user equipment in the coverage area of the first base station.

4. The method according to claim 1, wherein the method further comprises:
    sending, by the first base station, the interference channel information to the second base station.

5. An interference cancellation method, comprising:
    receiving, by a second base station, interference channel information of the second base station to a first base station that is sent by the first base station, wherein the interference channel information is determined by the first base station based on system information, and the system information is system information of a cell in which the second base station is located; and
    sending, by the second base station, a downlink signal to user equipment in a coverage area of the second base station based on the interference channel information, further comprising:
    sending, by the second base station based on the interference channel information, the downlink signal to the user equipment in the coverage area of the second base station in a null forming manner, wherein a null forming direction of a transmit beam used by the second base station to send the downlink signal is aligned with the first base station.

6. The method according to claim 5, wherein the interference channel information is a multiple-input multiple-output system (MIMO) interference channel matrix of the second base station to the first base station; and
    the sending, by the second base station based on the interference channel information, the downlink signal to the user equipment in the coverage area of the second base station in a null forming manner comprises:
    performing, by the second base station, singular value decomposition on the MIMO interference channel matrix to obtain the following factorization:

$H^C_{eNB1}=U_H \Lambda_H V_H$, wherein $H^C_{eNB1}$ is the MIMO interference channel matrix of the second base station to the first base station, $U_H$ and $V_H$ are singular vectors corresponding to $H^C_{eNB1}$, $H^C_{eNB1}$ is an m*n matrix, $U_H$ is a corresponding m*m matrix, and $V_H$ is a corresponding n*n matrix;
    determining, by the second base station, a quantity y of non-zero singular values of $\Lambda_H$;
    using, by the second base station, a vector behind a column y+1 of $V_H$ as a transmit null forming weight for the downlink signal; and
    sending, by the second base station, the downlink signal to the user equipment in the coverage area of the second base station based on the transmit null forming weight.

7. A first base station, comprising:
    a processor; and
    a non-transitory computer-readable storage medium coupled to the processor and storing programming instructions for execution by the processor, the programming instructions instruct the processor to:

obtain system information of a neighboring cell by:
  obtaining physical cell identifier (PCI) information of the neighboring cell using a sniffer, and
  obtaining the system information of the neighboring cell using the PCI information;
determine interference channel information of a second base station to the first base station based on the system information, wherein the second base station is a base station in a coverage area of the neighboring cell, further comprising the programming instructions to instruct the processor to determine a multiple-input multiple-output system (MIMO) interference channel matrix of the second base station to the first base station based on the system information; and
receive, based on the interference channel information, an uplink signal sent by user equipment in a coverage area of the first base station.

8. The base station according to claim 7, wherein the programming instructions instruct the processor to determine the MIMO interference channel matrix of the second base station to the first base station based on the system information comprises the programming instructions to instruct the processor to:
  determine the MIMO interference channel matrix of the second base station to the first base station using a synchronization sequence and a cell-specific reference signal (CRS) pilot sequence of the neighboring cell.

9. The base station according to claim 7, wherein the programming instructions instruct the processor to receive, based on the interference channel information, the uplink signal sent by user equipment in the coverage area of the first base station comprises the programming instructions to instruct the processor to:
  determine a corresponding interference autocorrelation matrix based on the MIMO interference channel matrix; and
  use the interference autocorrelation matrix to receive, using an interference rejection combining (IRC) receiver, the uplink signal sent by the user equipment in the coverage area of the first base station.

10. The base station according to claim 7, wherein the programming instructions further instruct the processor to:
  send the interference channel information to the second base station, wherein the second base station sends a downlink signal based on the interference channel information when sending the downlink signal to user equipment in a coverage area of the second base station.

11. A second base station, comprising:
a processor; and
a non-transitory computer-readable storage medium coupled to the processor and storing programming instructions for execution by the processor, the programming instructions instruct the processor to:
receive interference channel information of the second base station to a first base station that is sent by the first station, wherein the interference channel information is determined by the first base station based on system information, and the system information is system information of a cell in which the second base station is located; and
send a downlink signal to user equipment in a coverage area of the second base station based on the interference channel information, further comprising the programming instructions to instruct the processor to send, based on the interference channel information, the downlink signal to the user equipment in the coverage area of the second base station in a null forming manner, wherein a null forming direction of a transmit beam used by the second base station to send the downlink signal is aligned with the first base station.

12. The base station according to claim 11, wherein the interference channel information is a multiple-input multiple-output system (MIMO) interference channel matrix of the second base station to the first base station; and
the programming instructions further instruct the processor to:
perform singular value decomposition on the MIMO interference channel matrix to obtain the following factorization:

$H^C_{eNB1} = U_H \Lambda_H V_H$, wherein $H^C_{eNB1}$ is the MIMO interference channel matrix of the second base station to the first base station, $U_H$ and $V_H$ are singular vectors corresponding to $H^C_{eNB1}$, $H^C_{eNB1}$ is an m*n matrix, $U_H$ is a corresponding m*m matrix, and $V_H$ is a corresponding n*n matrix;
determine a quantity y of non-zero singular values of $\Lambda_H$; and
use a vector behind a column y+1 of $V_H$ as a transmit null forming weight for the downlink signal; and the programming instructions instruct the processor to send, based on the interference channel information, the downlink signal to the user equipment in the coverage area of the second base station in the null forming manner comprises the programming instructions to instruct the processor to:
send the downlink signal to the user equipment in the coverage area of the second base station based on the transmit null forming weight.

* * * * *